United States Patent
Srinivas et al.

(10) Patent No.: US 10,445,080 B2
(45) Date of Patent: Oct. 15, 2019

(54) METHODS FOR ADAPTIVE PLACEMENT OF APPLICATIONS AND DEVICES THEREOF

(71) Applicant: Wipro Limited, Bangalore (IN)

(72) Inventors: Prasad Varadaraj Srinivas, Bangalore (IN); Govindaraj Rangan, Bengaluru (IN)

(73) Assignee: Wipro Limited, Bangalore (IN)

( * ) Notice: Subject to any disclaimer, the term of this patent is extended or adjusted under 35 U.S.C. 154(b) by 308 days.

(21) Appl. No.: 15/447,576

(22) Filed: Mar. 2, 2017

(65) Prior Publication Data

US 2018/0196653 A1   Jul. 12, 2018

(30) Foreign Application Priority Data

Jan. 6, 2017   (IN) .............................. 201741000681

(51) Int. Cl.
*G06F 8/60*    (2018.01)
*G06N 20/00*   (2019.01)
(Continued)

(52) U.S. Cl.
CPC .............. *G06F 8/60* (2013.01); *G06F 9/5066* (2013.01); *G06N 5/046* (2013.01); *G06N 20/00* (2019.01); *H04L 67/02* (2013.01); *H04L 67/10* (2013.01)

(58) Field of Classification Search
CPC .................................. G06F 8/60; G06N 20/00
(Continued)

(56) References Cited

U.S. PATENT DOCUMENTS 8,429,598 B2 *   4/2013   Seitz ..................... G06F 9/5016
                                                        717/108
8,464,225 B2 *   6/2013   Greifeneder ........ G06F 11/3644
                                                        717/130
(Continued)

OTHER PUBLICATIONS

Xing, Jing, et al. "Adaptive and scalable metadata management to support a trillion files." Proceedings of the Conference on High Performance Computing Networking, Storage and Analysis. ACM, 2009.pp. 1-11 (Year: 2009).*
(Continued)

*Primary Examiner* — Satish Rampuria
(74) *Attorney, Agent, or Firm* — Pepper Hamilton LLP

(57) ABSTRACT

Methods, application placement management bot, and non-transitory computer readable media that obtain application meta data for a plurality of applications. The application meta data comprises application requirements and associated application attributes for each of the applications. A first subset of the application attributes is correlated with master attributes in a master attributes table based on a first set of keywords matching a stored second set of keywords mapped to the master attributes. The first set of keywords corresponds to one or more of the application requirements associated with the first subset of the application attributes. Rule set(s) are obtained that comprise customized rule(s) based on the master attributes. The rule set(s) are applied to the application meta data based on the correlation to determine a placement of each of the applications in at least one of a plurality of environments. An indication of the determined placement is output.

12 Claims, 4 Drawing Sheets

(51) Int. Cl.
*G06N 5/04* (2006.01)
*G06F 9/50* (2006.01)
*H04L 29/08* (2006.01)

(58) Field of Classification Search
USPC .................................................. 717/168–178
See application file for complete search history.

(56) References Cited

U.S. PATENT DOCUMENTS

| | | | | |
|---|---|---|---|---|
| 8,478,616 | B2* | 7/2013 | De Klerk | G06Q 10/10 |
| | | | | 705/7.11 |
| 8,539,589 | B2* | 9/2013 | Prafullchandra | G06Q 10/06 |
| | | | | 726/25 |
| 8,621,423 | B2* | 12/2013 | Knight | G06F 8/71 |
| | | | | 717/106 |
| 10,042,626 | B2* | 8/2018 | Nekrestyanov | G06F 8/65 |
| 2005/0022160 | A1* | 1/2005 | Uluakar | G06F 8/20 |
| | | | | 717/105 |
| 2009/0006409 | A1* | 1/2009 | Yang | G06F 8/20 |
| 2009/0019420 | A1* | 1/2009 | Johnson | G06F 8/36 |
| | | | | 717/101 |
| 2012/0239739 | A1* | 9/2012 | Manglik | G06F 9/5077 |
| | | | | 709/203 |
| 2013/0297802 | A1 | 5/2013 | Laribi et al. | |
| 2013/0219357 | A1* | 8/2013 | Reitan | G06F 3/011 |
| | | | | 717/116 |
| 2013/0290239 | A1 | 10/2013 | Vaquero et al. | |
| 2015/0169306 | A1 | 6/2015 | Labocki et al. | |
| 2016/0219117 | A1* | 7/2016 | Marlatt | G06F 9/5027 |

OTHER PUBLICATIONS

Hua, Yu, et al. "Scalable and adaptive metadata management in ultra large-scale file systems." 2008 The 28th International Conference on Distributed Computing Systems. IEEE, 2008.pp. 403-410 (Year: 2008).*

Agarwala, Sandip, Divyesh Jadav, and Luis A. Bathen. "iCostale: adaptive cost optimization for storage clouds." 2011 IEEE 4th International Conference on Cloud Computing. IEEE, 2011.pp. 436-443 (Year: 2011).*

* cited by examiner

METHODS FOR ADAPTIVE PLACEMENT OF APPLICATIONS AND DEVICES THEREOF

This application claims the benefit of Indian Patent Application Serial No. 201741000681, filed Jan. 6, 2017, which is hereby incorporated by reference in its entirety.

FIELD

This technology relates to methods for adaptive placement of applications in cloud environments and devices thereof.

BACKGROUND

Enterprises are increasingly hosting applications in different types of environments including public, private, and hosted cloud network environments, for example. Cloud deployments for applications can provide increased agility, increased elasticity, and a utilization-based consumption model, and can be desirable or undesirable according to application requirements. For example, some applications have minimal security requirements that render them better suited for deployment in a cloud environment while other applications have significant memory requirements that render them better suited for deployment on physical hardware.

Accordingly, enterprises are often required to make application placement decisions, which can be challenging. Software tools are currently available that assist with application deployment and migration decisions. Such current decision support systems generally apply predefined rules based on an application assessment to generate a recommended placement for a plurality of applications associated with a particular enterprise.

However, these tools have significant limitations that impact their utility. In particular, the applied rules often utilize parameters that do not directly correlate with imported attributes associated with applications to be placed. Further, the rules are not customizable, adaptable, or extensible with respect to the type or number of included parameters. Accordingly, current decision support systems utilize static rules having a static set of parameters, resulting in deficient placement decisions that decrease in effectiveness over time as application environments evolve.

SUMMARY

A method for adaptive placement of applications implemented by an application placement management bot including obtaining application meta data for a plurality of applications. The application meta data comprises application requirements and associated application attributes for each of the applications. A first subset of the application attributes is correlated with master attributes in a master attributes table based on a first set of keywords matching a stored second set of keywords mapped to the master attributes. The first set of keywords corresponds to one or more of the application requirements associated with the first subset of the application attributes. Rule set(s) are obtained that comprise customized rule(s) based on the master attributes. The rule set(s) are applied to the application meta data based on the correlation to determine a placement of each of the applications in at least one of a plurality of environments. An indication of the determined placement is output.

An application placement management bot includes memory comprising programmed instructions stored thereon and one or more processors coupled to the memory and configured to be capable of executing the stored programmed instructions to obtain application meta data for a plurality of applications. The application meta data comprises application requirements and associated application attributes for each of the applications. A first subset of the application attributes is correlated with master attributes in a master attributes table based on a first set of keywords matching a stored second set of keywords mapped to the master attributes. The first set of keywords corresponds to one or more of the application requirements associated with the first subset of the application meta attributes. Rule set(s) are obtained that comprise customized rule(s) based on the master attributes. The rule set(s) are applied to the application meta data based on the correlation to determine a placement of each of the applications in at least one of a plurality of environments. An indication of the determined placement is output.

A non-transitory computer readable medium having stored thereon instructions for adaptive placement of applications includes executable code which when executed by one or more processors, causes the processors to obtain application meta data for a plurality of applications. The application meta data comprises application requirements and associated application attributes for each of the applications. A first subset of the application attributes is correlated with master attributes in a master attributes table based on a first set of keywords matching a stored second set of keywords mapped to the master attributes. The first set of keywords corresponds to one or more of the application requirements associated with the first subset of the application attributes. Rule set(s) are obtained that comprise customized rule(s) based on the master attributes. The rule set(s) are applied to the application meta data based on the correlation to determine a placement of each of the applications in at least one of a plurality of environments. An indication of the determined placement is output.

This technology provides a number of advantages including methods, and non-transitory computer readable media that more effectively generate placement decisions for enterprise applications with respect to a number of different types of environments. With this technology, applications attributes are more effectively imported and correlated with a master set of attributes. Additionally, a machine learning technique is utilized to identify new application attributes to add to the master set of attributes. Moreover, customized rules can be generated that utilize the dynamic, increasingly robust set of master attributes to generate more accurate placement decisions for applications.

DETAILED DESCRIPTION

Figure 1:
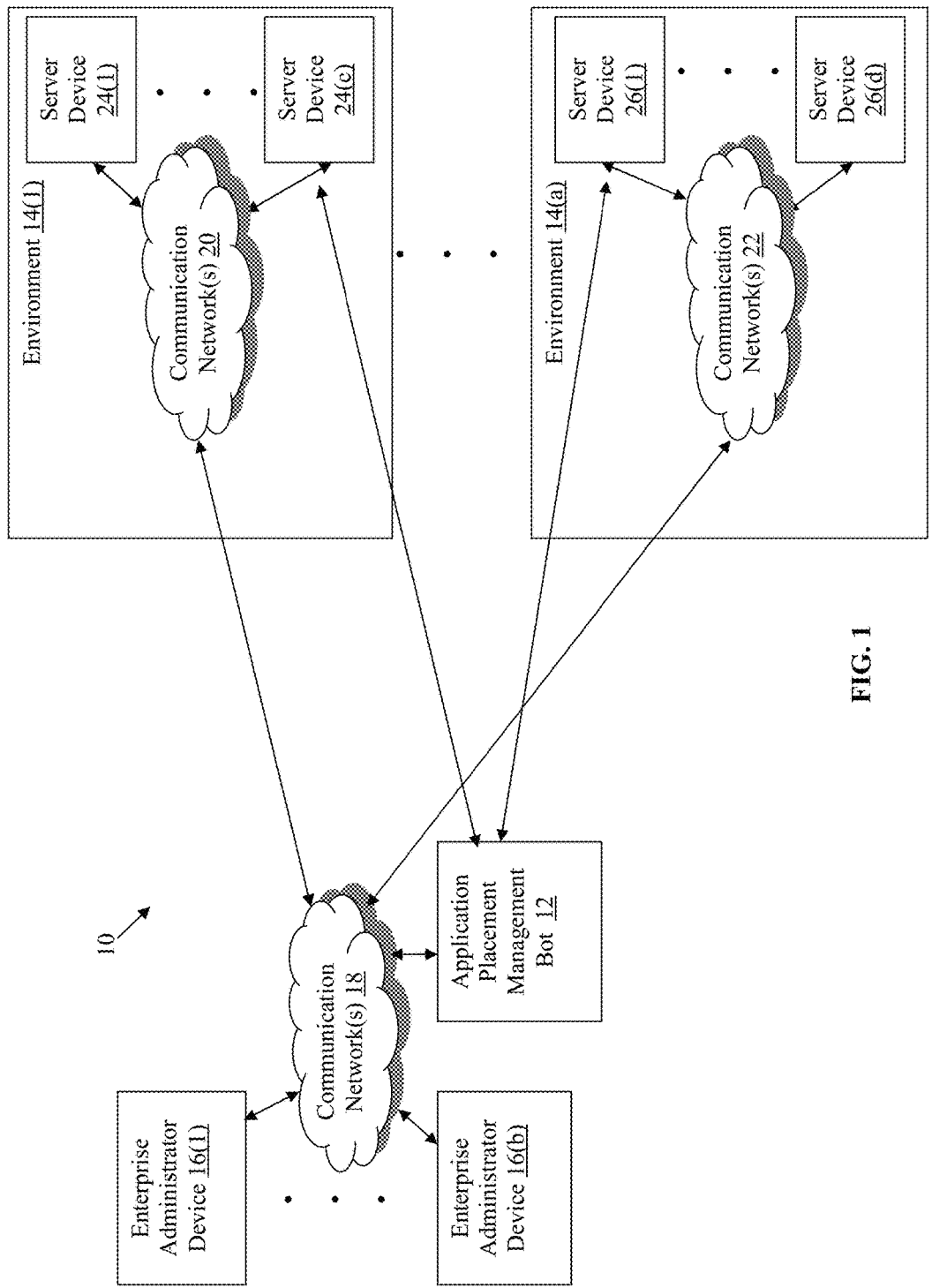
FIG. 1 is a diagram of an example of a network with an application placement management bot.

A network 10 with an example of an application placement management bot 12 is illustrated in FIG. 1. In this particular example, the application placement management bot 12 is coupled to environments 14(1)-14(a) and enterprise administrator devices 16(1)-16(b) by communication network(s) 18. The environments 14(1)-14(a) can be cloud environments, such as public, private, or hosted cloud environments or non-cloud environments. The environments 14(1)-14(a) include communication networks 20 and 22 and server devices 24(1)-24(c) and 26(1)-26(d), respectively. The network 10 could also include other types and numbers of systems, devices, components, and/or other elements in other configurations. This technology provides a number of advantages including methods, devices, and non-transitory computer readable media that more effectively import application meta data and generate placement decisions for applications in cloud and other types of environments.

Figure 2:
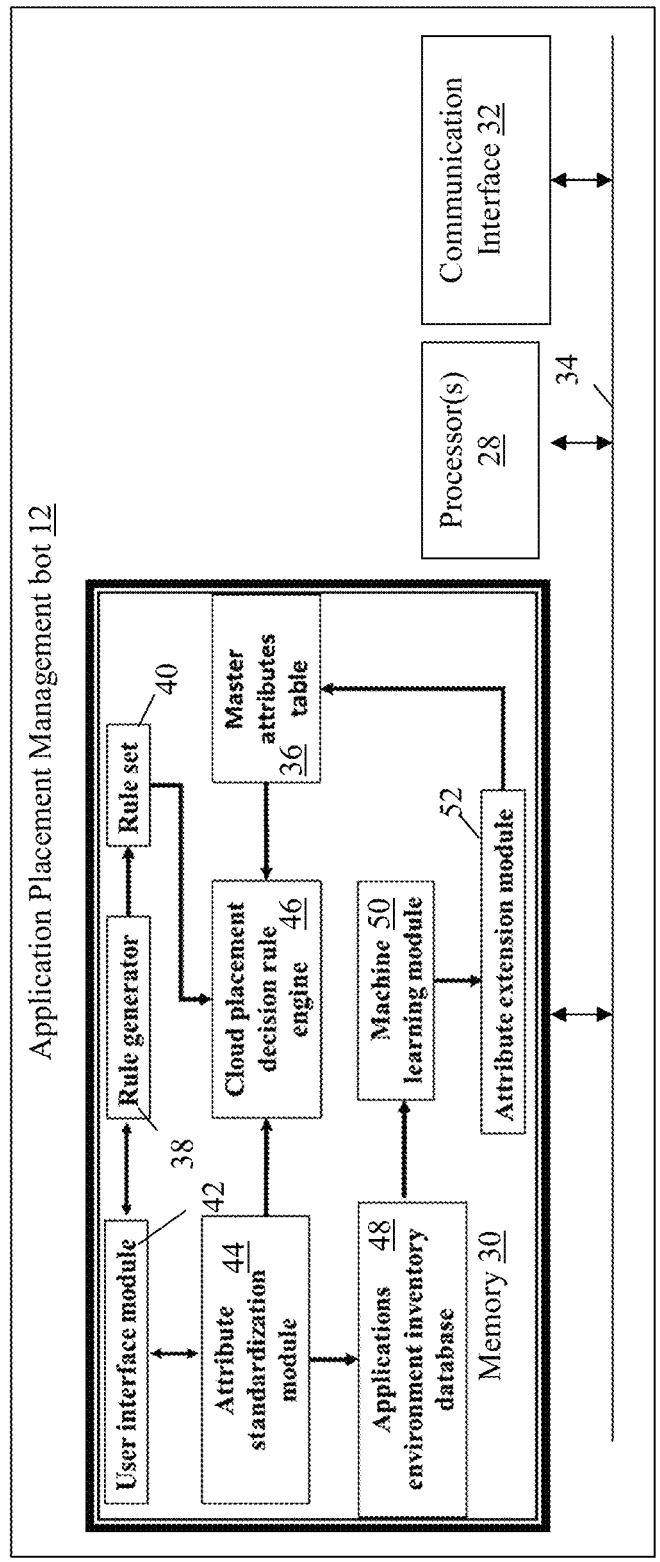
FIG. 2 is a block diagram of an example of the application placement management bot illustrated in FIG. 1.

Referring more specifically to FIGS. 1-2, the application placement management bot 12 in this particular example can include one or more processor(s) 28, a memory 30, and a communication interface 32, which are coupled together by a bus 34 or other communication link, although the application placement management bot 12 can include other types and/or numbers of physical and/or virtual systems and/or processors, devices, components, and/or other elements in other configurations.

The processor(s) 28 of the application placement management bot 12 can execute one or more programmed instructions stored in the memory 30 for importing application meta data and generating application placement decisions, as illustrated and described in the examples herein, although other types and/or numbers of instructions can also be performed. The processor(s) 28 may include one or more central processing units and/or general purpose processors with one or more processing cores, for example.

The memory 30 of the application placement management bot 12 stores the programmed instructions executed by the processor(s) 28 as well as other data for one or more aspects of the present technology as described and illustrated herein, although some or all of the programmed instructions could be stored and executed elsewhere. A variety of different types of memory storage devices, such as a random access memory (RAM), read only memory (ROM), flash, solid state drives (SSDs), or other computer readable medium which is read from and written to by a magnetic, optical, or other reading and writing system that is coupled to the processor(s) 28, can be used for the memory 30.

In this particular example, the memory 30 includes a master attributes table 36, a rule generator 38, a rule set 40, a user interface module 42, an attribute standardization module 44, a cloud placement decision rule engine 46, an applications environment inventory database 48, a machine learning module 50, and an attribute extension module 52, although the memory 30 can also include other data, modules, or applications in other examples. The master attributes table 36 in this example contains a set of pre-defined master attributes that can be used to evaluate rules in order to generate application placement decisions. Application attributes in imported application meta data can be correlated with the master attributes in the master attributes table 36 and the set of master attributes in the master attributes table 36 is dynamic, as described and illustrated in more detail later.

The rule generator 38 provides an interface for an enterprise administrator to input customized rules based on any number of the master attributes in the master attributes table 36. The rule generator obtained an input from one of the enterprise administrator devices 16(1)-16(b), for example, and generates a rule, optionally in a JavaScript Object Notation (JSON) format, for making application placement decisions.

The rule set 40 includes a plurality of rules output by the rule generator 38. The rule set can be a database or other data storage structure and any number of rule sets can be stored in the memory 30. Optionally, an enterprise administrator can select the rule set 40 to be applied in a particular iteration. The output using the rule set 40 can then be compared to the output using another rule set in order to better inform an enterprise administrator regarding the impact of certain rules on the placement of applications for the enterprise and to thereby facilitate a more effective application deployment or migration.

The user interface module 42 is configured to generate user interfaces, such as GUIs for example, that receive inputs from the enterprise administrator devices 16(1)-16(b) including application meta data for target enterprise applications that require cloud placement decisions and/or assessment. Accordingly, the user interface module 42 can facilitate importing of application meta data, including application requirements associated with different application attributes for a plurality of applications. Optionally, the user interface module 42 can also generate and output user interfaces for importing characteristics of the environments 14(1)-14(a) and/or receiving the various rule of the rule set 40, for example.

The attribute standardization module 44 in this example is configured to convert imported application meta data into a standardized or normalized field-set based on the master attributes in master attributes table 36. Accordingly, the attribute standardization module 44 can process imported application meta data to identify application attributes and convert the application attributes based on the correlated or corresponding master attributes in the master attributes table 36.

The cloud placement decision rule engine 46 generates placement decisions for target enterprise applications by applying the rules in the rule set 40 to the standardized application meta data output by the attribute standardization module 44. The output of the cloud placement decision rule engine 46 can be in indication of one or more of the environments 14(1)-14(a) for each of the target applications for which application meta data was imported via the user interface module 42. The operation of the cloud placement decision rule engine 46 is described and illustrated in more detail later with reference to FIG. 5.

The applications environment inventory database 48 stores application meta data including application requirements and associated application attributes for a plurality of applications, as well as characteristic data associated with the environments 14(1)-14(a). The contents of the application environment inventory database 48 can be used by the cloud placement decision rule engine 46 to generate the placement decisions for target enterprise applications.

The machine learning module 50 also uses the contents of the application environment inventory database 48 to perform a machine learning process in order to recognize new application attributes. The machine learning module 50 detects patterns of values that do not match existing master attributes in the master attribute table, as described and illustrated in more detail later with reference to FIG. 3.

The attribute extension module 52 in this example updates the master attributes table 36 based on the output of the machine learning module 50, which includes at least an indication of one or more application attributes to be added to the master attributes table 36. Accordingly, the combination of the machine learning module 50 and the attribute extension module 52 adapts the master attributes table 36 facilitating dynamic evaluation of applications for suitable to move to different ones of the environments 14(1)-14(a) over time. More specifically, the attribute extension module 52 advantageously facilitates the extension of the parameters boundary with respect to the parameters of rules that can be evaluated by the cloud placement decision rule engine 46 to generate application placement decisions.

The communication interface 32 of the application placement management bot 12 operatively couples and communicates between the enterprise administrator devices 16(1)-16(b) and environments 14(1)-14(a) over the communication network(s) 18. By way of example only, the communication network(s) 18, 20, and/or 22 can include local area network(s) (LAN(s)) or wide area network(s) (WAN(s)), and can use TCP/IP over Ethernet and industry-standard protocols, although other types and numbers of protocols and/or communication networks can be used. The communication network(s) 18, 20, and/or 22 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

Each of the enterprise administrator devices 16(1)-16(b) in this example includes one or more processors, a memory, and a communication interface, which are coupled together by a bus or other communication link, although other numbers and/or types of network devices could be used. The enterprise administrator devices 16(1)-16(b) can be used by enterprise administrators to interface with the application placement management bot 12 via the communication network(s) 18, such as to input data and receive placement decisions via user interfaces provided by the application placement management bot 12. One or more of the enterprise administrator devices 16(1)-16(b) can be associated with any number of different enterprises hosting applications in one or more of the environments 14(1)-14(a).

Each of the server devices 24(1)-24(c) and 26(1)-26(d) in this example includes one or more processors, a memory, and a communication interface, which are coupled together by a bus or other communication link, although other numbers and/or types of network devices could be used. The server devices 24(1)-24(c) and 26(1)-26(d) in this example host enterprise applications and process requests received from user devices via the communication network(s) 20 and 22 according to the HTTP-based application RFC protocol, for example. The server devices 24(1)-24(c) and 26(1)-26(d) may be hardware or software and the associated environments 14(1)-14(a) can be any type of cloud or non-cloud network including private, public, and hosted cloud networks, for example. One or more of the environments 14(1)-14(a) can be associated with any number of different enterprises.

Although the exemplary network 10 with the application placement management bot 12, enterprise administrator devices 16(1)-16(b), server devices 24(1)-24(c) and 26(1)-26(d), and communication network(s) 18, 20, and 22 are illustrated and described herein, other types and numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices, apparatuses, and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as one or more non-transitory computer readable media having instructions stored thereon for one or more aspects of the present technology as described and illustrated by way of the examples herein, as described herein, which when executed by one or more processors, cause the processors to carry out the steps necessary to implement the methods of this technology as described and illustrated with the examples herein.

Figure 3:
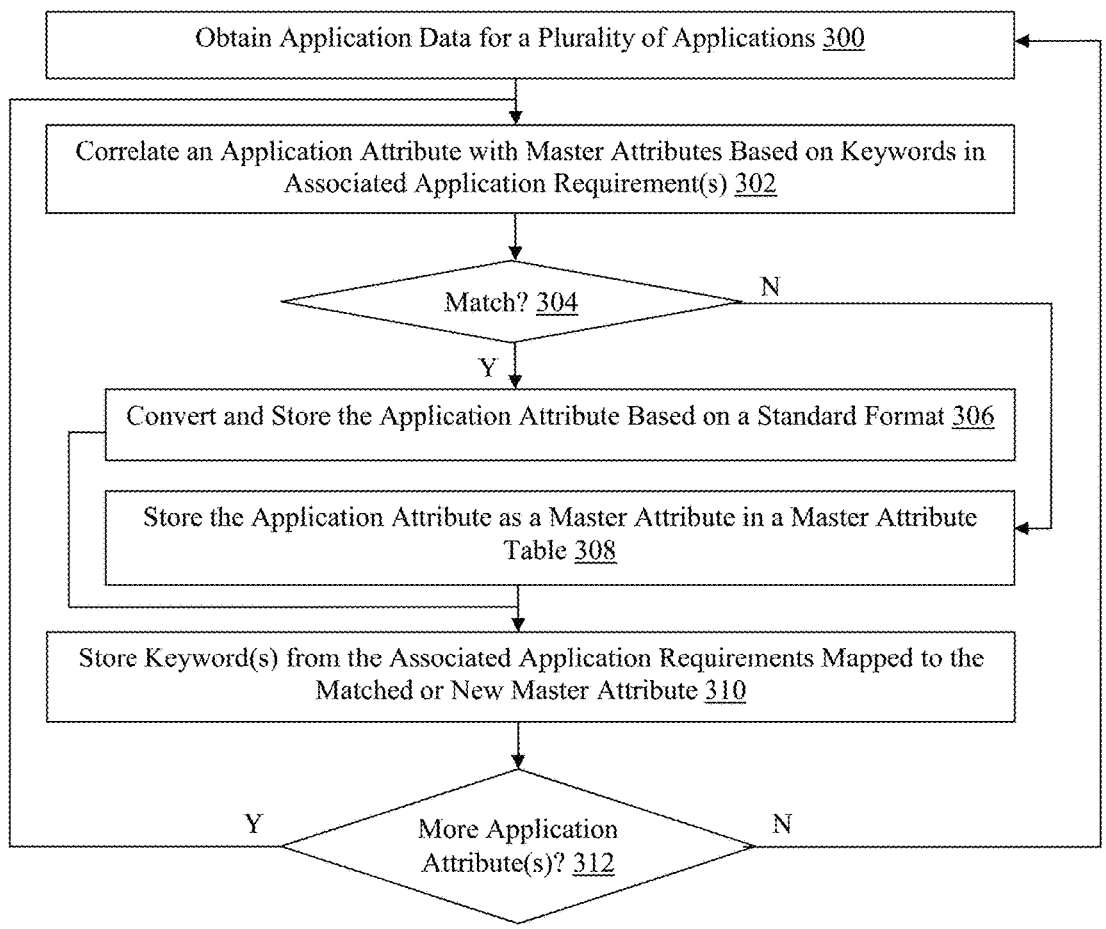
FIG. 3 is a flow chart of an example of a method for importing application attributes and utilizing machine learning to maintain a dynamic set of master attributes.

An example of a method for adaptive placement of applications will now be described with reference to FIGS. 3-5. Referring more specifically to FIG. 3, a method for importing application attributes and utilizing machine learning to maintain a dynamic set of master attributes is illustrated. In step 300 in this example, the application placement management bot 12 obtains application meta data for a plurality of applications. The application meta data can be obtained via a user interface provided to one of the enterprise administrator devices 16(1)-16(b), for example, although the application meta data can also be obtained in other ways. The application meta data includes at least application attributes and associated application requirements for the plurality of applications, although other types of application meta data can also be obtained in step 300.

Figures 4, 5:
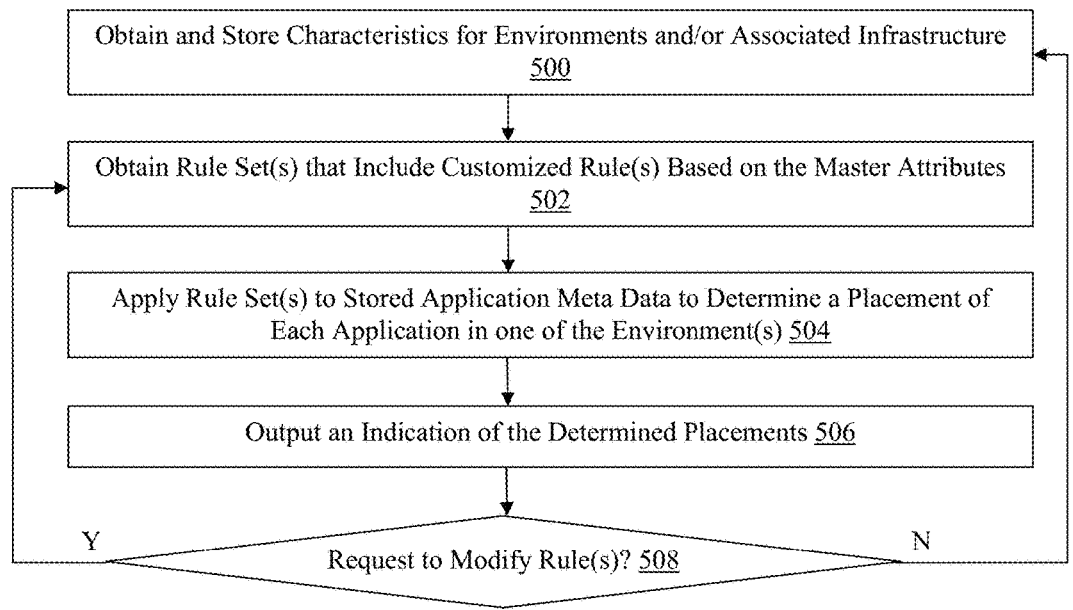
FIG. 4 is an example of an application meta data table storing a set of imported application meta data including application attributes and associated requirements.
FIG. 5 is a flow chart of an example of a method for generating application placement decisions based on customized rules and the dynamic set of master attributes.

Referring more specifically to FIG. 4, an example of an application meta data table storing a set of imported application meta data including application attributes and associated application requirements is illustrated. In this particular example, the application meta data is obtained in a table format, although other types of formats can also be used in other examples. The application meta data includes a row of application requirements for each of the applications and a column for each of a plurality of application attributes. Exemplary application attributes can include server hardware make/model, application architecture, application cost, minimum or maximum memory, minimum or maximum compute or processing power, operating system, and regulatory compliance, although other type or number of application attributes can be used in other examples.

Referring back to FIG. 3, in step 302, the application placement management bot 12 attempts to correlate one of the application attributes with one of the master attributes in the master attributes table 36. The correlation can be based on the name of the one application attribute or keywords in application requirements associated with the one application attribute. Often, an enterprise will use a particular nomenclature for application attributes that is different from both that used by one or more other enterprises and that which is contained in the master attributes table 36. For example, the application attribute "memory" may be contained in the master attributes table 36 and the application meta data might contain a column named "RAM".

In this example, the "RAM" application attribute would not directly correlate with any of the master attributes in the master attributes table 36. Accordingly, the application placement management bot 12 uses keywords in application requirements associated with the "RAM" application attribute in the application meta data to correlate the "RAM" application attribute. In this example, a keyword might be "gigabytes" or "GB", although other types of features or values of application requirements, and/or other application meta data associated with an application attribute, can also be used to correlate the application attribute.

Optionally, the keywords in the application meta data can be compared with keywords stored in the master attribute table 36 associated with the master attributes, for example, although the keywords can also be stored elsewhere in other examples. The keywords can be stored and/or updated as described and illustrated in more detail below with reference to step 310.

In step 304, the application placement management bot 12 determines whether there is a match of the one application attribute with one of the master attributes based on the correlation. If the application placement management bot 12 determines that there is a match of the one application attribute, then the Yes branch is taken to step 306.

In step 306, the application placement management bot 12 converts and stores the one application attribute based on a standard format. The one application attribute can be converted by the attribute standardization module 44 and stored in the application environment inventory database 48 as associated with the corresponding application requirements from the obtained application meta data. Accordingly, in the above example, the "RAM" application attribute may be converted to "memory", and optionally the corresponding application requirements and/or other associated application meta data can also be converted into a standard format.

However, if the application placement management bot 12 determines in step 304 that there is not a match of the one application attribute, then the No branch is taken to step 308. In step 308, the application placement management bot 12 stores the one application attribute as a master attribute in the master attribute table 36. The application placement management bot 12 further stores the one application attribute and corresponding application requirements and/or other application meta data in the application environment inventor database 48. Subsequent to converting and storing the one application attribute in step 306, or storing the one application attribute as a master attribute in step 308, the application placement management bot 12 proceeds to step 310.

In step 310, the application placement management bot 12 optionally stores one or more keywords from the associated application requirements mapped to the matched or new master attribute. The keyword(s) can be stored in the master attribute table 36, for example, although the application environment inventory database 48 or another location can also be used to store the keywords. In the example described earlier, if the "RAM" attribute is observed in application meta data for the first time and is therefore a new master attribute, the "gigabyte" and/or "GB" keywords may be stored in the master attributes table 36 as associated with the new "RAM" master attribute. Other types of keywords and methods of maintaining keywords for purposes of the machine learning process performed by the machine learning module 50 can also be used. Optionally, an initial set of training data including keywords and application attributes can be used by the machine learning module 50 to pre-populate the master attribute table 36.

In step 312, the application placement management bot 12 determines whether there are more application attributes (e.g., columns) in the application meta data obtained in step 300. If the application placement management bot 12 determines that there is at least one additional application attribute in the obtained application meta data, then the Yes branch is taken back to step 302 and the application placement management bot 12 again attempts to correlate one of the application attributes with one of the master attributes. However, if the application placement management bot 12 determines that there are no more application attributes to be analyzed, then the No branch is taken back to step 300 and the application placement management bot 12 again obtains application meta data from the same or a different one of the enterprise administrator devices 16(1)-16(b).

Accordingly, the application placement management bot 12 can advantageously perform an automated import of application meta data associated with an enterprise while improving the amount of application meta data that can be correlated with master attributes and used to formulate application placement rules, as described and illustrated in more detail later. Moreover, the application placement management bot 12 can continually and dynamically update the master attributes in the master attributes table 36 based on analyzed application meta data obtained from enterprises in order to strengthen the set of master attributes and facilitate more robust application placement decisions.

Referring more specifically to FIG. 5, a method for generating application placement decisions based on customized rules and a dynamic set of master attributes is illustrated. In step 500 in this example, the application placement management bot 12 obtains and stores characteristics for one or more of the environments 14(1)-14(a) that are available to host applications for an enterprise. The environment characteristics can be stored in the application environment inventory database 48, for example.

The environments 14(1)-14(a) can include one or more public cloud environments, private cloud environments, hosted cloud environments, on premise environments, virtualized environments, or non-cloud environments, for example, and other types of environments can also be used. Accordingly, the characteristics can include the type of environment, data regarding infrastructure of the environment such as capabilities of the server devices 24(1)-24(c) and/or 26(1)-26(d) for example, security data, or any other data that can be compared with application requirements that can be obtained from an enterprise as described and illustrated in more detail earlier with reference to step 300 of FIG. 3.

In step 502, the application placement management bot 12 obtains one or more rules for inclusion in the stored rule set 40. The rules can be obtained from one of the enterprise administrator devices 16(1)-16(b) via an interface provided by the application placement management bot 12, for example. In this example, the rules are customized and the interface can allow a user of the one of the enterprise administrator devices 16(1)-16(b) to verify attributes and configure various rules for each decision point relating to placement of applications in the one or more of the environments 141(1)-14(a).

The rules are generated based on the master attributes stored in the master attributes table 36. Since the master attributes are dynamic, the rules are not limited with respect to the number of parameters or master attributes. In one particular example, a rule requires that the determined placement of applications with memory requirements within a range of 2 GB to 4 GB is in environment 14(1), although any types or number or parameters and/or rules can be used to generate the rule set 40. Optionally, the provided interface includes a selectable list of master attributes and facilitates input of one or more values associated with one or more of the master attributes in order to formulate the obtained rules.

In step 504, the application placement management bot 12 applies one or more stored rule sets, such as rule set 40, based on the contents of the applications environment inventory database 48. Accordingly, the application placement management bot 12 applies at least the rule set 40 to stored, standardized application meta data, such as application requirements, and environment characteristics in order to determine a placement for each application identified in the application meta data in one of the environments 14(1)-14(a).

In step 506, the application placement management bot 12 outputs an indication of the placement determined in step 504. In one example, multiple rule sets can be generated and applied, and the application placement management bot 12 can be used as a planning tool for an enterprise administrator to determine the placement of applications should certain rules and/or parameters be adjusted in order to determine an optimal placement for the applications. In step 508, the application placement management bot 12 determines whether a request to modify any of the rules obtained in step 502 is received, such as from one of the enterprise administrator devices 16(1)-16(b) and via a provided interface. One or more of the rules can be modified to facilitate a determination by an enterprise administrator of the impact of an adjustment to one or more rules on the placement of the applications. Accordingly, if the application placement management bot 12 determines that a request to modify one or more of the rules is received, then the Yes branch is taken back to step 502 and the application placement management bot 12 obtains one or more new rules, or an adjustment of one or more master attributes in one or more stored rules. However, if the application placement management bot 12 determines that a request to modify one or more of the rules is not received, then the No branch is taken back to step 500 in this example.

Accordingly, with this technology, application meta data can be efficiently imported, correlated with a set of master attributes, and used in a machine learning process to extend the set of master attributes based on changing application requirements and environments. Accordingly, the set of master attributes is advantageously dynamic, which facilitates custom, extensible application placement rules and more effective application placement decisions for enterprises.

Having thus described the basic concept of this technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of this technology. Additionally, the recited order of processing elements or sequences, or the use of numbers, letters, or other designations therefore, is not intended to limit the claimed processes to any order except as may be specified in the claims. Accordingly, this technology is limited only by the following claims and equivalents thereto.

What is claimed is:

1. A method for placement of applications implemented by an application placement management bot, the method comprising:

obtaining application meta data for a plurality of applications, the application meta data comprising application requirements and associated application attributes for each of the applications;

correlating a first subset of the application attributes with one or more of a plurality of master attributes in a master attributes table based on a first set of keywords matching a stored second set of keywords mapped to the one or more master attributes, the first set of keywords corresponding to one or more of the application requirements associated with the first subset of the application attributes;

identifying a second subset of the application attributes not correlated with any of the master attributes;

inserting the second subset of the application attributes into the master attribute table, wherein the master attribute table is dynamic and adaptable over time based on application evolution;

storing a third set of keywords mapped to the second subset of the application attributes in the master attribute table, the third set of keywords corresponding to one or more of the application requirements associated with the second subset of the application attributes, wherein one or more of the first or third sets of keywords comprises a value or data type of one or more of the application requirements;

obtaining one or more rule sets each comprising one or more customized rules based on the master attributes; and applying the rule sets to the application meta data based on the correlation to determine a placement of each of the applications in at least one of a plurality of environments and output an indication of the determined placement.

2. The method of claim 1, wherein the customized rules are each in a JavaScript Object Notation (JSON) format and are each extensible and include one or more values for any number of the master attributes.

3. The method of claim 1, wherein each of the first subset of the application attributes comprises a name that is different than another name of each of the master attributes and the method further comprises:

converting the first subset of the application attributes into a standardized field set based on a format of the one or more master attributes; and applying the rule sets to the application meta data further based on the standardized field set.

4. The method of claim 1, further comprising applying the rule sets to one or more stored characteristics of one or more of the environments or an infrastructure associated with one or more of the environments, wherein the environments comprise one or more public cloud environments, private cloud environments, hosted cloud environments, on premise environments, virtualized environments, or non-cloud environments.

5. An application placement management bot, comprising memory comprising programmed instructions stored thereon and one or more processors coupled to the memory and configured to be capable of executing the stored programmed instructions to:

obtain application meta data for a plurality of applications, the application meta data comprising application requirements and associated application attributes for each of the applications;

correlate a first subset of the application attributes with one or more of a plurality of master attributes in a master attributes table based on a first set of keywords matching a stored second set of keywords mapped to the one or more master attributes, the first set of keywords corresponding to one or more of the application requirements associated with the first subset of the application attributes;

identify a second subset of the application attributes not correlated with any of the master attributes;

insert the second subset of the application attributes into the master attribute table, wherein the master attribute table is dynamic and adaptable over time based on application evolution;

store a third set of keywords mapped to the second subset of the application attributes in the master attribute table, the third set of keywords corresponding to one or more of the application requirements associated with the second subset of the application attributes, wherein one or more of the first or third sets of keywords comprises a value or data type of one or more of the application requirements;

obtain one or more rule sets each comprising one or more customized rules based on the master attributes; and apply the rule sets to the application meta data based on the correlation to determine a placement of each of the applications in at least one of a plurality of environments and output an indication of the determined placement.

6. The application placement management bot of claim 5, wherein the customized rules are each in a JavaScript Object Notation (JSON) format and are each extensible and include one or more values for any number of the master attributes.

7. The application placement management bot of claim 5, wherein each of the first subset of the application attributes comprises a name that is different than another name of each of the master attributes and the one or more processors are further configured to be capable of executing the stored programmed instructions to:

convert the first subset of the application attributes into a standardized field set based on a format of the one or more master attributes; and apply the rule sets to the application meta data further based on the standardized field set.

8. The application placement management bot of claim 5, wherein the one or more processors are further configured to be capable of capable of executing the stored programmed instructions to apply the rule sets to one or more stored characteristics of one or more of the environments or an infrastructure associated with one or more of the environments, wherein the environments comprise one or more public cloud environments, private cloud environments, hosted cloud environments, on premise environments, virtualized environments, or non-cloud environments.

9. A non-transitory computer readable medium having stored thereon instructions for placement of applications comprising executable code which when executed by one or more processors, causes the one or more processors to:

obtain application meta data for a plurality of applications, the application meta data comprising application requirements and associated application attributes for each of the applications;

correlate a first subset of the application attributes with one or more of a plurality of master attributes in a master attributes table based on a first set of keywords matching a stored second set of keywords mapped to the one or more master attributes, the first set of keywords corresponding to one or more of the application requirements associated with the first subset of the application attributes;

identify a second subset of the application attributes not correlated with any of the master attributes;

insert the second subset of the application attributes into the master attribute table, wherein the master attribute table is dynamic and adaptable over time based on application evolution;

store a third set of keywords mapped to the second subset of the application attributes in the master attribute table, the third set of keywords corresponding to one or more of the application requirements associated with the second subset of the application attributes, wherein one or more of the first or third sets of keywords comprises a value or data type of one or more of the application requirements;

obtain one or more rule sets each comprising one or more customized rules based on the master attributes; and apply the rule sets to the application meta data based on the correlation to determine a placement of each of the applications in at least one of a plurality of environments and output an indication of the determined placement.

10. The non-transitory computer readable medium of claim 9, wherein the customized rules are each in a JavaScript Object Notation (JSON) format and are each extensible and include one or more values for any number of the master attributes.

11. The non-transitory computer readable medium of claim 9, wherein each of the first subset of the application attributes comprises a name that is different than another name of each of the master attributes and the executable code, when executed by the one or more processors, further causes the one or more processors to:

convert the first subset of the application attributes into a standardized field set based on a format of the one or more master attributes; and apply the rule sets to the application meta data further based on the standardized field set.

12. The non-transitory computer readable medium of claim 9, wherein the executable code, when executed by the one or more processors, further causes the one or more processors to apply the rule sets to one or more stored characteristics of one or more of the environments or an infrastructure associated with one or more of the environments, wherein the environments comprise one or more public cloud environments, private cloud environments, hosted cloud environments, on premise environments, virtualized environments, or non-cloud environments.

* * * * *